No. 642,919. Patented Feb. 6, 1900.
C. C. NOTT.
BICYCLE EXERCISING STAND.
(Application filed July 29, 1899.)
(No Model.) 2 Sheets—Sheet 1.
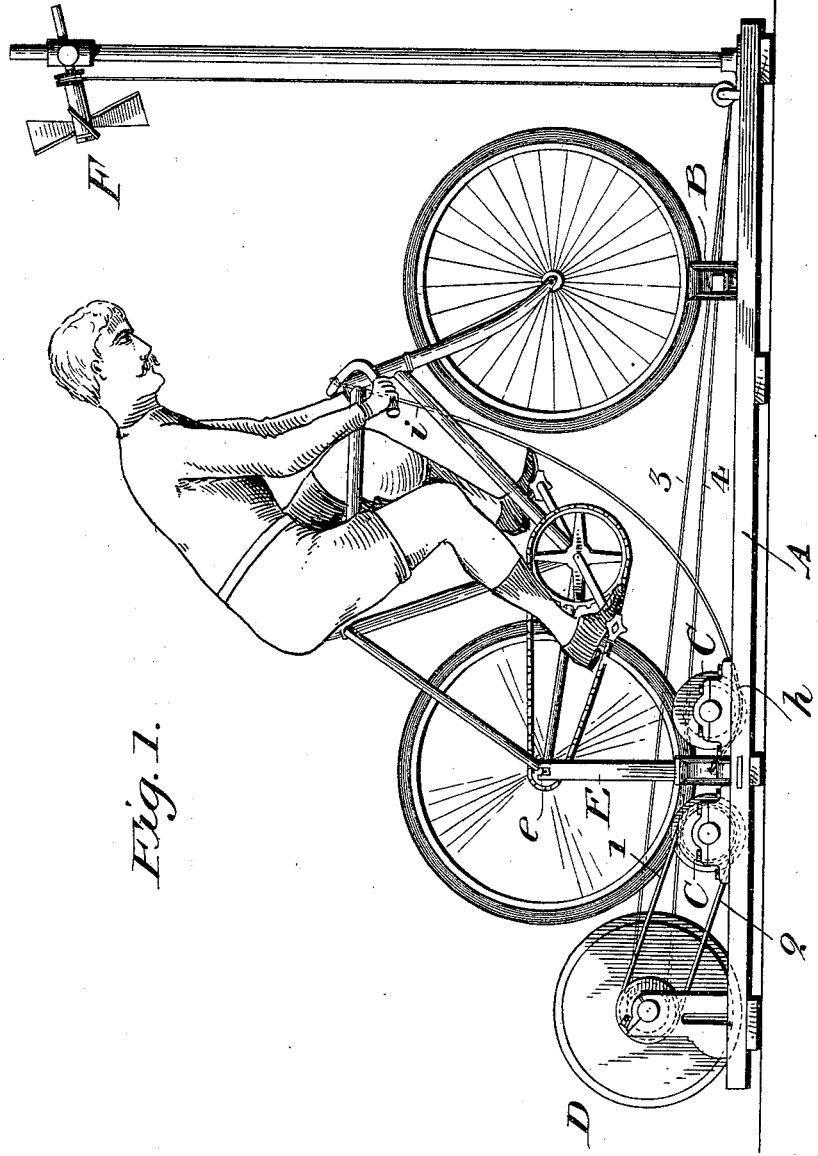
Witnesses:
L. C. Hills.
Ewell A. Dick
Inventor
Charles C. Nott
By Marcellus Bailey.
his Attorney

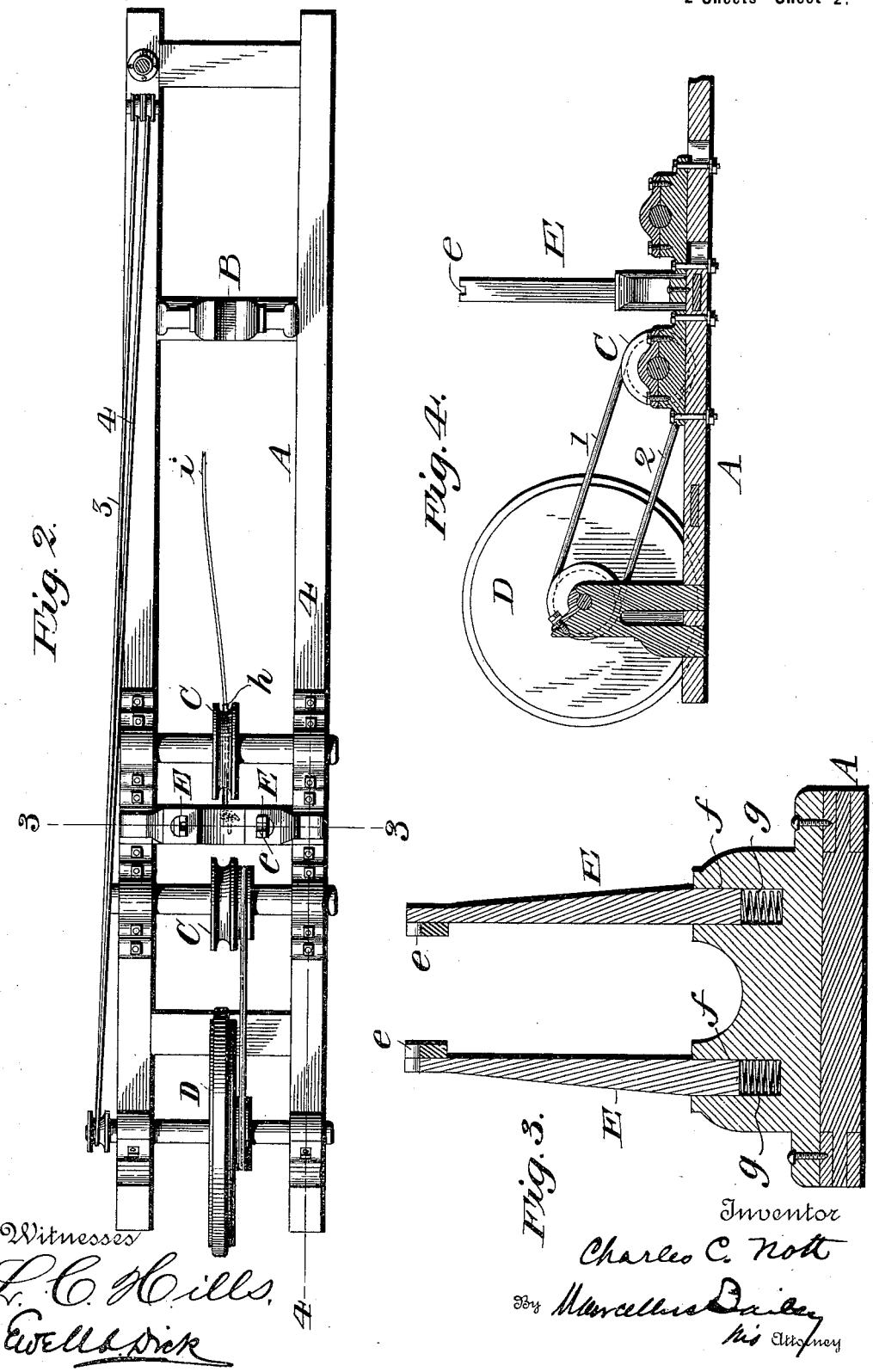

UNITED STATES PATENT OFFICE.

CHARLES COOPER NOTT, OF WASHINGTON, DISTRICT OF COLUMBIA.

BICYCLE EXERCISING-STAND.

SPECIFICATION forming part of Letters Patent No. 642,919, dated February 6, 1900.

Application filed July 29, 1899. Serial No. 725,526. (No model.)

*To all whom it may concern:*

Be it known that I, CHARLES COOPER NOTT, a citizen of the United States, residing in Washington city, in the District of Columbia, have invented a new and useful Improvement in Bicycle Exercising-Stands, of which the following is a specification.

My invention has relation to that kind of bicycle exercising stand or apparatus in which a moving road-bed for the driving-wheel of the bicycle is combined with supports by which the wheel may be retained in upright position thereon.

The invention will first be described in connection with the drawings accompanying and forming part of this specification and will then be more particularly pointed out in the claims.

In the said drawings, Figure 1 is a side elevation of the apparatus with a bicycle in position thereon. Fig. 2 is a plan of the apparatus. Fig. 3 is a section on line 3 3, Fig. 2. Fig. 4 is a section on line 4 4, Fig. 2.

The parts of the apparatus are mounted on and attached to a suitable base or supporting-frame A.

In front is a grooved block B to receive the front wheel of the bicycle. This block should be of a length—say six inches—sufficient to accommodate bicycles of different lengths without readjustment of the block itself. The groove in the block should be of sufficient width and depth to receive the tire of an ordinary bicycle and to prevent its displacement laterally. At a suitable distance in rear of the block B are located two grooved pulleys or rollers C, placed tandem and in line with one another. These rollers or pulleys form the moving road-bed on which will rest the rear or driving wheel of the bicycle. These two rollers will be revolved by the bicycle-wheel when the latter is driven from the pedals. Geared to one of the rollers C by suitable means—in this instance by belt and pulley 1 2—is a balance or fly wheel D, which must be of sufficient size and weight and be run at sufficient speed to overcome the inertia of the pedal-cranks and carry them around by its momentum, as the bicycle itself would do were it running upon an ordinary roadway.

In order to keep the bicycle erect in its place on the grooved rollers C and the grooved block B, as well as to restrain the bicycle from forward or backward movement, I employ lateral supports which receive the ends of the axle of the rear bicycle-wheel and are preferably made vertically spring-yielding, the object of this latter provision being to give to the rider the free sweeping movement of a bicycle on the road and also to accommodate slight differences in the size of bicycle-wheels or such differences as may be caused by the greater or less inflation of the tire. Said supports in the present instance consist of vertical standards or posts E, having seats or open slots *e* in their tops for receiving the ends of the wheel-axle and fitting at their lower ends in sockets *f* in the frame, in which they are vertically movable, said lower ends of the standards resting upon coiled springs *g*, which are placed in the bottom of the sockets.

A suitable brake should be provided for the moving road-bed, to be controlled at will by the rider. The brake shown in the drawings consists of a single shoe *h*, which may be of wood or leather, hinged or jointed to a cross-piece on the frame A and arranged to contact with the front one of the two rollers C and connected to the bicycle-handle by an elastic cord *i*, which the rider can loosen or tighten at will.

The apparatus also may be provided with a fan F, mounted on the front of the same, so as to face the rider. This fan is driven by suitable gearing, such as the belt and pulleys 3 4, from the fly-wheel or other moving part of the apparatus, and the purpose of it is to afford the rider the refreshment of an artificial breeze.

Having described my invention, what I claim herein as new, and desire to secure by Letters Patent, is as follows:

1. In a bicycle exercising-stand, the combination of a stationary support for the front wheel of the bicycle, grooved rollers adapted to support and be driven by the hind wheel thereof, a balance-wheel driven by said rollers and lateral supports provided with open slots or seats in their upper ends for reception of the ends of the axle of the rear wheel and adapted to restrain the bicycle from longitudinal and lateral movement, substantially as and for the purposes hereinbefore set forth.

2. In a bicycle exercising-stand, the combination with grooved rollers adapted to support and be driven by the hind wheel of the bicycle, of lateral spring-supports vertically yielding and provided in their upper ends with open slots or seats to receive the ends of the axle of said wheel and adapted to restrain the bicycle from longitudinal and lateral movement, substantially as and for the purposes hereinbefore set forth.

In testimony whereof I have hereunto set my hand this 21st day of July, 1899.

CHARLES COOPER NOTT.

Witnesses:
SAML. S. TOWN,
A. E. EVENS.